United States Patent
Matsushita

(10) Patent No.: US 11,731,734 B2
(45) Date of Patent: Aug. 22, 2023

(54) ELECTRIC SNOWMOBILE

(71) Applicant: Yamaha Hatsudoki Kabushiki Kaisha, Shizuoka (JP)

(72) Inventor: Yasushi Matsushita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 17/366,047

(22) Filed: Jul. 2, 2021

(65) Prior Publication Data
US 2022/0009589 A1    Jan. 13, 2022

(30) Foreign Application Priority Data
Jul. 9, 2020   (JP) .................... 2020-118374

(51) Int. Cl.
*B62M 27/02*   (2006.01)
*B60L 50/60*   (2019.01)
(Continued)

(52) U.S. Cl.
CPC ............. *B62M 27/02* (2013.01); *B60L 50/60* (2019.02); *B60L 2200/00* (2013.01); *B62M 2027/025* (2013.01); *B62M 2027/027* (2013.01)

(58) Field of Classification Search
CPC .......... B60L 50/60; B60L 50/64; B60L 50/66; B60L 2200/00; B62M 27/02; B62M 2027/025; B62M 2027/027; B62M 2027/028; B62J 43/00; B62J 43/10; B62J 43/16; B62J 43/20; B62J 43/28; B62K 2202/00; B62K 2204/00; B60K 2001/0466
(Continued)

(56) References Cited

U.S. PATENT DOCUMENTS

| 8,376,075 B2 * | 2/2013 | Sasage | B62K 11/10 |
| | | | 180/68.5 |
| 8,602,139 B2 * | 12/2013 | Takamura | B60L 50/51 |
| | | | 180/68.5 |

(Continued)

FOREIGN PATENT DOCUMENTS

| CA | 3125395 A1 | 8/2020 | |
| GB | 2390837 * | 1/2004 | ........... B62M 27/02 |

(Continued)

OTHER PUBLICATIONS

Office Action dated Oct. 25, 2022, for corresponding CA Patent Application No. 3,123,823, pp. 1-3.

*Primary Examiner* — Anne Marie M Boehler
(74) *Attorney, Agent, or Firm* — HEA Law PLLC

(57) ABSTRACT

An electric snowmobile that can reduce a load locally applied to a body frame is provided. The electric snowmobile includes a body frame, a right ski and a left ski, a track mechanism, a steering shaft, an electric motor, and a battery. The body frame includes a shaft support frame that rotatably supports the steering shaft, a front frame that extends forwardly and downwardly from the shaft support frame, and a rear frame that extends rearwardly and downwardly from the shaft support frame. The battery is supported by the front frame and the rear frame such that at least a portion of the battery is disposed in a region formed by a line connecting the front frame, the rear frame, a lower end of the front frame, and a lower end of the rear frame in a side view.

15 Claims, 7 Drawing Sheets

(51) Int. Cl.
  *B62J 43/10* (2020.01)
  *B62J 43/20* (2020.01)
(58) Field of Classification Search
  USPC .................................................. 180/68.5, 190
  See application file for complete search history.

(56) References Cited

U.S. PATENT DOCUMENTS

| | | | |
|---|---|---|---|
| 10,046,667 B2* | 8/2018 | Orimo ..................... | B62M 7/12 |
| 10,173,512 B1* | 1/2019 | Huang ..................... | B60L 50/66 |
| 10,597,105 B2 | 3/2020 | Lefebvre et al. | |
| 2009/0198372 A1* | 8/2009 | Hammerslag .......... | H02J 7/0045 |
| | | | 700/226 |
| 2010/0090797 A1* | 4/2010 | Koenig ................... | B60R 25/23 |
| | | | 340/5.22 |
| 2014/0305729 A1* | 10/2014 | Testoni ................... | B62J 43/16 |
| | | | 180/220 |
| 2016/0200397 A1 | 7/2016 | Vezina et al. | |
| 2019/0305276 A1* | 10/2019 | Suzuki ..................... | B60L 50/64 |
| 2019/0367128 A1* | 12/2019 | Schoenfelder ........... | B62M 6/90 |
| 2020/0088089 A1 | 3/2020 | Vezina et al. | |
| 2020/0140037 A1* | 5/2020 | Haavikko .............. | B62D 55/07 |
| 2022/0041250 A1* | 2/2022 | Muron ................... | B62M 27/02 |
| 2022/0135124 A1* | 5/2022 | Krammel ........... | B60G 17/0162 |
| | | | 280/6.15 |
| 2022/0219784 A1* | 7/2022 | Bruneau ................. | B60K 1/04 |
| 2022/0227459 A1* | 7/2022 | Kauppinen .............. | B62J 43/10 |
| 2022/0411018 A1* | 12/2022 | Vaisanen ............. | B60L 15/2072 |

FOREIGN PATENT DOCUMENTS

| | | | | |
|---|---|---|---|---|
| JP | 2007182137 | * | 7/2007 | ........... B62M 27/02 |
| WO | WO2021/084520 | * | 5/2021 | ........... B62W 10/08 |

* cited by examiner

ELECTRIC SNOWMOBILE

CROSS-REFERENCE TO RELATED APPLICATION

The present application claims priority from Japanese application JP2020-118374 filed on Jul. 9, 2020, the content of which is hereby incorporated by reference into this application.

Field of the Invention

The present invention relates to an electric snowmobile.

BACKGROUND OF THE INVENTION

Description of the Related Art

US2016/0200397A discloses a snowmobile including a pipe frame forming the framework of the vehicle body.

Here, a snowmobile traveling by an electric motor is desired in view of quietness, for example. The electric motor is driven by electric power supplied from a battery mounted on a vehicle body. Such electric motors and batteries may be provided and supported by the frame as disclosed in US2016/0200397A. However, the load on the frame increases if a heavy member, such as a battery, is supported by the frame.

One of the objects of the present disclosure is to provide an electric snowmobile that reduces a load locally applied to a vehicle body.

SUMMARY OF THE INVENTION (1) The electric snowmobiles proposed in the present disclosure includes a body frame, a ski supported by the body frame, a track mechanism including a track belt and supported by the body frame more rearward than the ski, a steering shaft supported by the body frame, an electric motor supported by the body frame, a battery supported by the body frame and supplying electric power to the electric motor, wherein the body frame includes a shaft support frame that rotatably supports the steering shaft, a front frame that extends forwardly and downwardly from the shaft support frame, and a rear frame that extends rearwardly and downwardly from the shaft support frame, and the battery is supported by the front frame and the rear frame such that at least a portion of the battery is disposed in a region formed by a line connecting the front frame, the rear frame, a lower end of the front frame, and a lower end of the rear frame in a side view. According to this electric snowmobile, a locally applied load to a vehicle body can be reduced.

(2) In the electric snowmobile according to (1), the front frame may include a right front frame and a left front frame that are provided to be spaced apart from each other in a vehicle width direction, the rear frame may include a right rear frame and a left rear frame that are provided to be spaced apart from each other in a vehicle width direction, and the battery may be supported by the right front frame, the left front frame, the right rear frame, and the left rear frame. According to this, the load of the battery can be dispersed in at least four positions.

(3) The electric snowmobile according to (1) includes a housing for housing the battery, where the battery is supported by the front frame and the rear frame via the housing. This structure protects the battery from being damaged.

(4) In the electric snowmobile according to (3), the housing may be mounted on the front frame and the rear frame at a mounting portion positioned above a bottom surface of the battery. This allows the space to be effectively utilized.

(5) In the electric snowmobile according to (3), the housing may be mounted on at least one of the front frame or the rear frame at a mounting portion, where at least a part of the mounting portion is positioned above an upper surface of the battery. This allows the space to be effectively utilized.

(6) In the electric snowmobile according to (1), the battery may be positioned more rearward than a lower end of the steering shaft. This can place the center of gravity of the vehicle body rearward, thereby enabling comfortable travel.

(7) In the electric snowmobile according to (1), the battery may be positioned more rearward than a mounting position of the ski on the body frame. This can place the center of gravity of the vehicle body rearward, thereby enabling comfortable travel.

(8) In the electric snowmobile according to (1), at least a portion of the battery may be positioned more forward than the track belt.

(9) In the electric snowmobile according to (1), the electric motor may be supported by the body frame more downward than the battery. This can lower the center of gravity of the vehicle body, thereby enabling comfortable travel.

(10) In the electric snowmobile according to (1), the battery may be supported by the front frame and the rear frame such that a bottom surface of the battery is apart from the body frame. This allows the battery to avoid contact with moisture on the frame.

(11) In the electric snowmobile according to (1), the electric motor may be positioned more rearward than a mounting position of the ski to the body frame. This can place the center of gravity of the vehicle body rearward, thereby enabling comfortable travel.

(12) In the electric snowmobile according to (1), the electric motor may be positioned more forward than the track belt.

(13) In the electric snowmobile according to (1), the battery may have a substantially cubic shape in which a length of the battery in a front-rear direction is larger than a width of the battery in a vehicle width direction.

(14) In the electric snowmobile described in (1), the battery may have a substantially cubic shape in which a length of the battery in a vehicle width direction is larger than a width of the battery in a front-rear direction.

DETAILED DESCRIPTION OF THE INVENTION

An embodiment of the present invention (hereinafter, referred to as "present embodiment") will be described below in detail with reference to the accompanying drawings.

Figure 1:
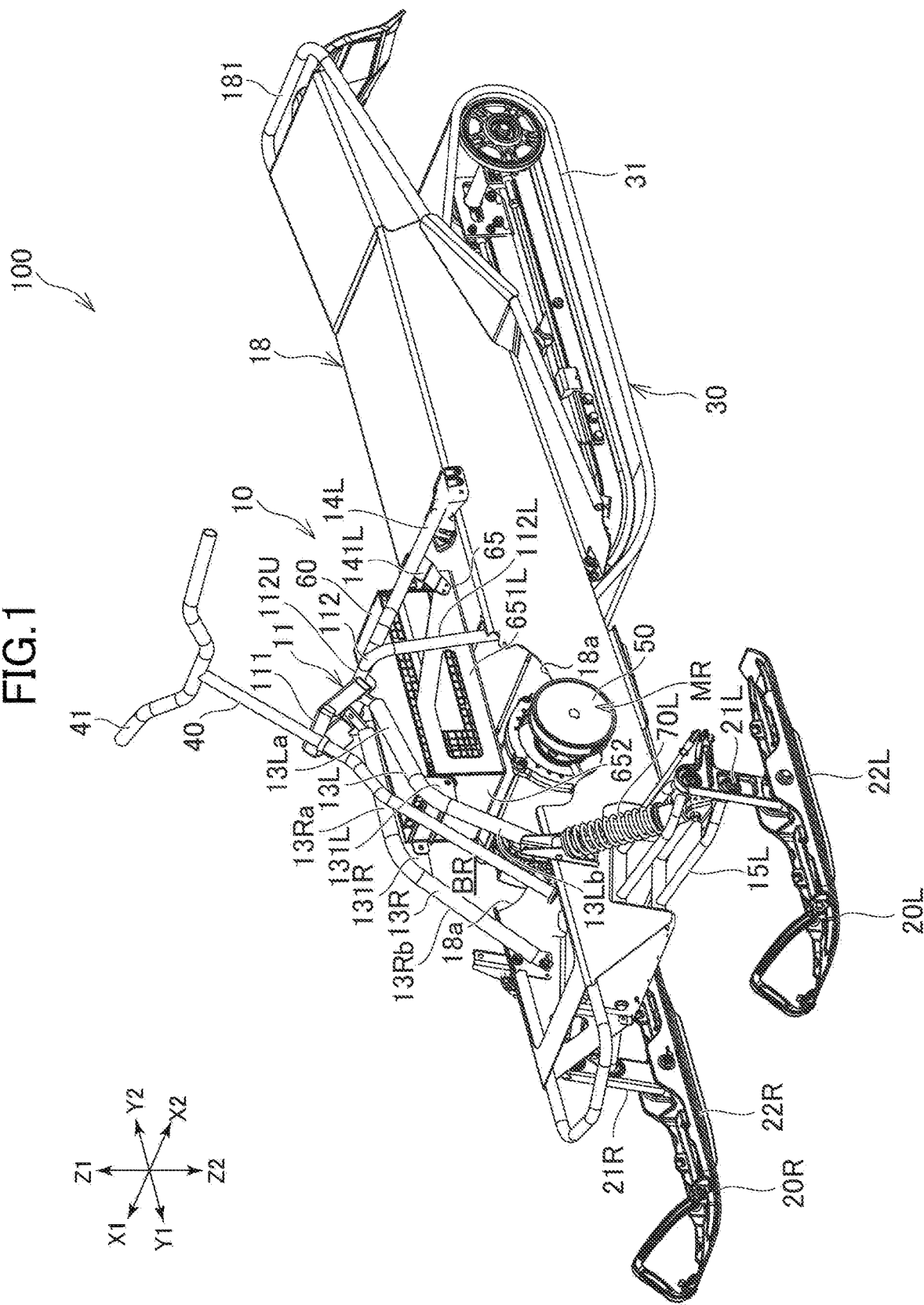
FIG. 1 is a perspective view of an electric snowmobile according to the present embodiment seen obliquely from above on a front side of the electric snowmobile.
Figure 2:
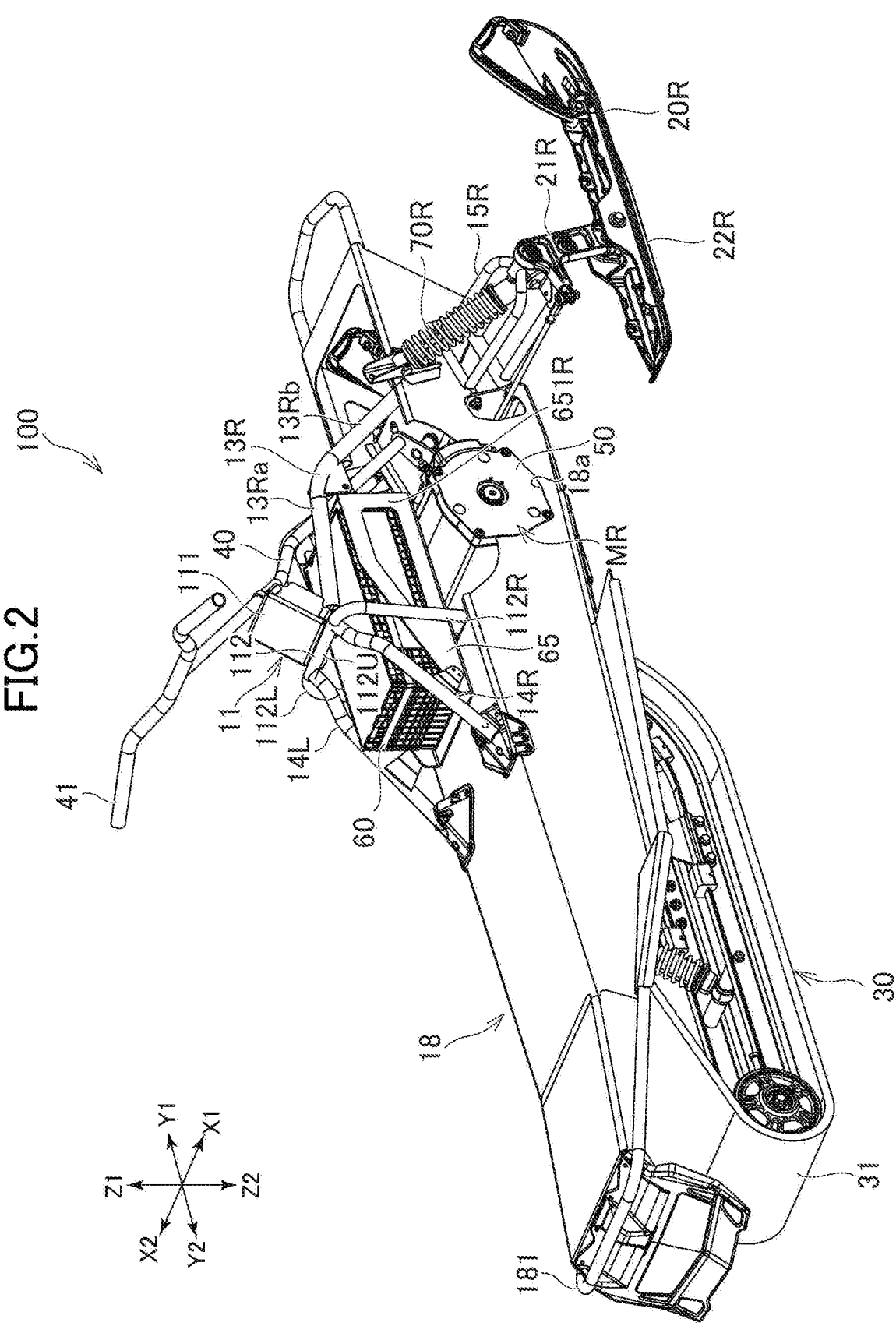
FIG. 2 is a perspective view of the electric snowmobile according to the present embodiment seen obliquely from above on a rear side of the electric snowmobile.
Figure 3:
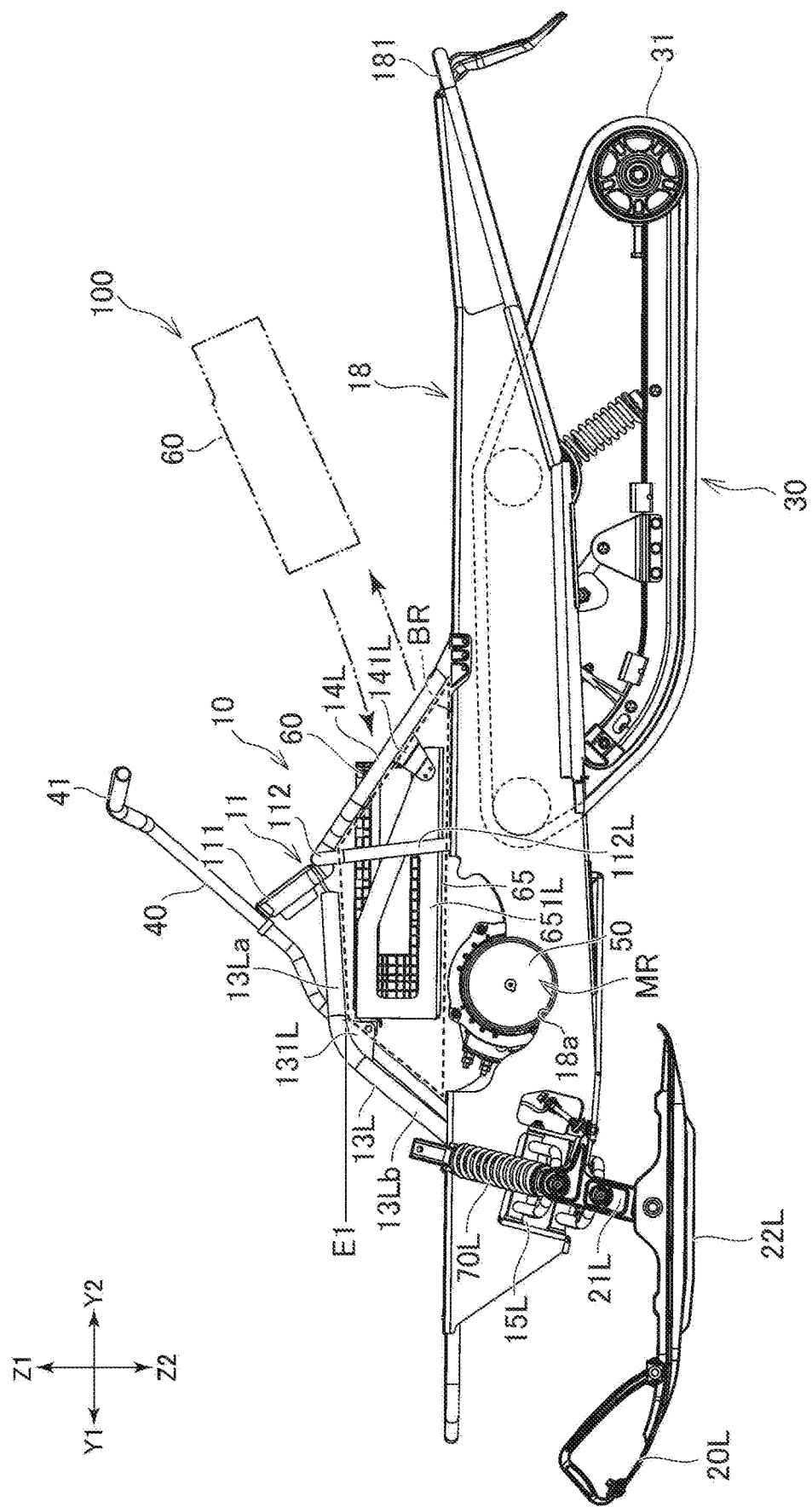
FIG. 3 is a side view of the electric snowmobile according to the present embodiment seen from the left.
Figure 4:
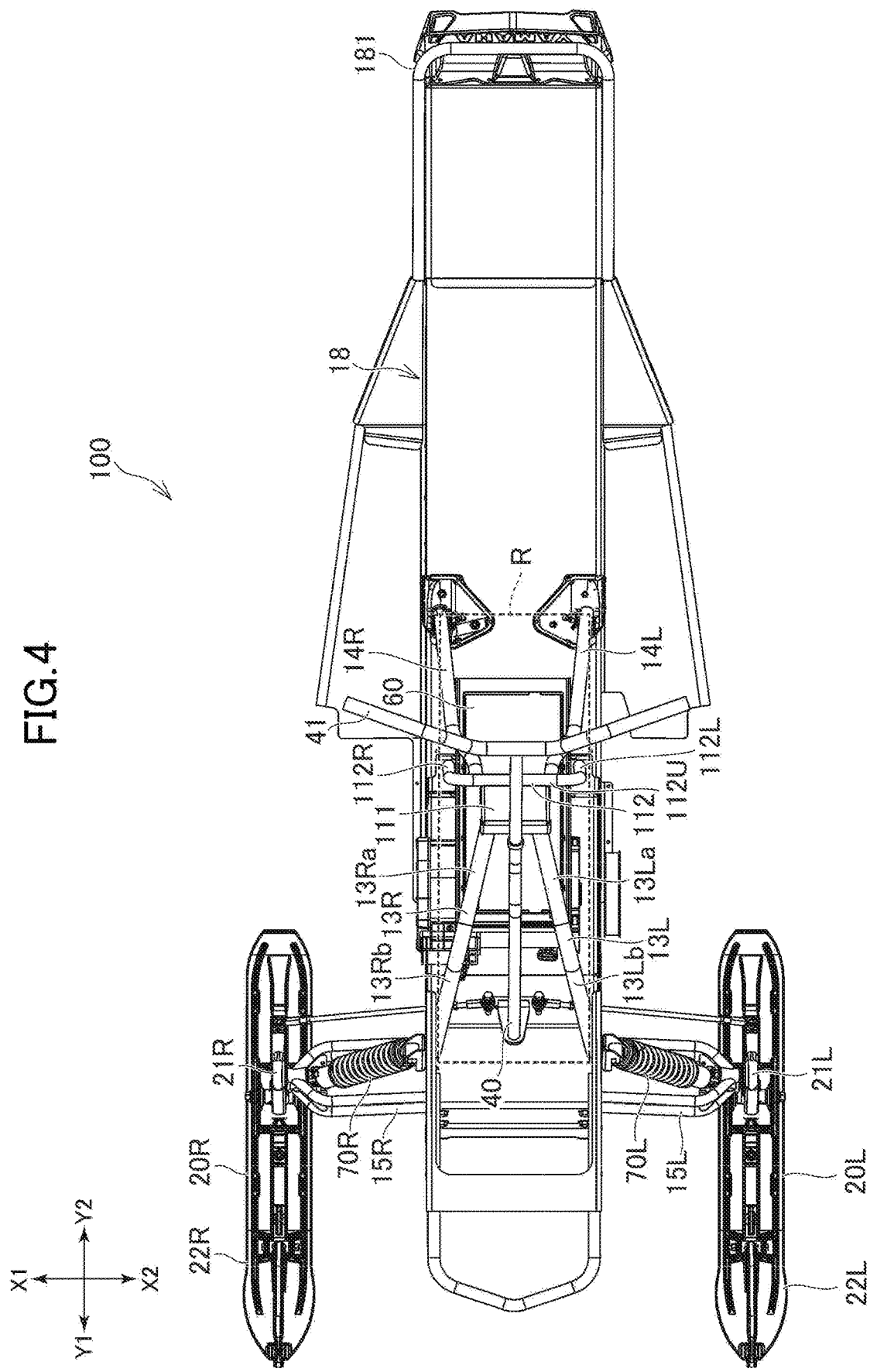
FIG. 4 is a top view of the electric snowmobile according to the present embodiment.

FIG. 1 is a perspective view of an electric snowmobile according to the present embodiment seen obliquely from above on a front side of the electric snowmobile. FIG. 2 is a perspective view of the electric snowmobile according to the present embodiment seen obliquely from above on a rear side of the electric snowmobile. FIG. 3 is a side view of the electric snowmobile according to the present embodiment seen from the left. FIG. 4 is a top view of the electric snowmobile according to the present embodiment.

In the following description, the directions indicated by Y1 and Y2 in the respective drawings are referred to as a front direction and a rear direction, respectively. The directions indicated by X1 and X2 are referred to as a right direction and a left direction, respectively. The direction indicated by Z1 and Z2 are referred to as an upward direction and a downward direction, respectively.

In the present specification, the term "supported" ("support") is used not only to indicate that a first member is directly attached to and supported by (supports) a second member, but also to indicate that the first member is attached to a third member and is supported by the second member via the third member.

[Outline of Electric Snowmobile 100]

An electric snowmobile 100 is a straddled vehicle that travels mainly on the snow. The electric snowmobile 100 travels by driving an electric motor 50 by electric power from a battery 60.

In each drawing, an outer cover and a driver's seat are omitted so that a body frame 10 forming the skeleton of the vehicle body can be visually recognized. Further, an inverter for controlling the electric motor 50 is also omitted.

The snowmobile 100 includes a body frame 10, a right ski 20R and a left ski 20L, a track mechanism 30, a steering shaft 40, an electric motor 50, and a battery 60.

[Body Frame 10]

The body frame 10 forms the skeleton of the vehicle body and also supports each component of the electric snowmobile 100. Specifically, the body frame 10 supports the right ski 20R, the left ski 20L, the track mechanism 30, the steering shaft 40, the electric motor 50, and the battery 60.

The body frame 10 includes an upper frame mainly composed of pipe-shaped members. The upper frame includes a shaft support frame 11, a right front frame 13R, a left front frame 13L, a right rear frame 14R, and a left rear frame 14L.

The body frame 10 includes a lower frame 18 that supports a lower end of the pipe-shaped upper frame. The lower frame 18 extends in the front-rear direction, and supports the lower end of the upper frame at its front portion, and a bumper 181 is provided at its rear portion. A driver's seat (not shown) is supported by a portion of the lower frame 18 rearward of the front portion for supporting the lower end of the upper frame and forward of the bumper 181.

The steering shaft 40 extends upwardly and rearwardly. The lower end of the steering shaft 40 is rotatably supported by the lower frame 18, and a steering handle 41 is provided at the upper end of the steering shaft 40. The steering shaft 40 is also rotatably supported by a shaft support frame 11 at the middle of its lower end and upper end.

The shaft support frame 11 includes a support portion 111 and an auxiliary frame 112 to which the support portion 111 is attached.

As shown in FIG. 3, the support portion 111 extends rearwardly and downwardly in a side view and its front end rotatably supports the steering shaft 40.

The auxiliary frame 112 has an inverted U-shape composed of an upper portion 112U to which the support portion 111 is attached and extends in the left-right direction, a right portion 112R extending rightward and downward from the upper portion 112U, and a left portion 112L extending leftward and downward from the upper portion 112U. The lower ends of the right portion 112R and the left portion 112L are supported by the lower frame 18.

The right front frame 13R includes a forward extending portion 13Ra extending forwardly from the shaft support frame 11 and an inclined portion 13Rb extending forwardly and downwardly from the forward extending portion 13Ra.

The left front frame 13L includes a forward extending portion 13La extending forwardly from the shaft support frame 11, and an inclined portion 13Lb extending forwardly and downwardly from the forward extending portion 13La.

The right front frame 13R and the left front frame 13L are provided to be spaced apart from each other in the vehicle width direction.

As shown in FIG. 4, the right front frame 13R is inclined in the right direction toward the front. The left front frame 13L is inclined in the left direction toward the front. That is, the right front frame 13R and the left front frame 13L are provided so as to be spaced apart from each other toward the front.

The right rear frame 14R and the left rear frame 14L extend rearwardly and downwardly from the shaft support frame 11. The right rear frame 14R and the left rear frame 14L are provided to be spaced apart from each other in the vehicle width direction.

As shown in FIG. 4, the right rear frame 14R is inclined in the right direction toward the rear. The left rear frame 14L is inclined in the left direction toward the rear. That is, the right rear frame 14R and the left rear frame 14L are provided so as to be spaced apart from each other toward the rear.

The body frame 10 further includes a right ski support frame 15R and a left ski support frame 15L. The right ski support frame 15R extends rightward at the front portion of the lower frame 18 and supports the right ski 20R at its right end. The left ski support frame 15L extends leftward at the front portion of the lower frame 18 and supports the left ski 20L at its left end.

The frames and the portions forming the body frame 10 may be formed integrally, or may be separated and fixed to each other by coupling means such as bolts or welding or other known methods. Further, the frames and the portions forming the body frame 10 may be made of resin and integrally formed with each other.

[Right Ski 20R, Left Ski 20L]

The right ski 20R is composed of a supported portion 21R supported by the right ski support frame 15R and extending downward, and a plate portion 22R attached to the lower end of the supported portion 21R. Similarly, the left ski 20L is composed of a supported portion 21L supported by the left ski support frame 15L and extending downward, and a plate portion 22L attached to the lower end of the supported portion 21R.

In the present embodiment, suspensions 70R and 70L each having a spring structure and a damper are provided so as to cross the right ski 20R, the left ski 20L, and the lower frame 18.

[Track Mechanism 30]

The track mechanism 30 is supported by the lower frame 18 more rearward than the right ski 20R and the left ski 20L. The track mechanism 30 includes a track belt 31 that is rotated by the driving force of the electric motor 50. The rotation of the track belt 31 moves the vehicle body.

[Electric Motor 50]

The electric motor 50 is supported by the lower frame 18 and is disposed below the battery 60.

In the present embodiment, the lower frame 18 includes a motor housing region MR (see e.g., FIG. 1) for housing the electric motor 50 in a top view at a position overlapping a rectangular region R (see FIG. 4) formed by a line connecting the respective lower ends of the right front frame 13R, the left front frame 13L, the right rear frame 14R, and the left rear frame 14R. The motor housing region MR is a region that is recessed with respect to the upper surface of the lower frame 18, and notches 18a are formed at the left and right ends of the motor housing region MR. The left and right end portions of the electric motor 50 are fitted into the notches 18a and supported by the lower frame 18.

The motor housing region MR is formed below the battery 60. That is, the electric motor 50 is disposed below the battery 60. In other words, the electric motor 50 and the battery 60 are disposed so as to at least partially overlap with each other in a top view in the front-rear direction. As described, the relatively heavy electric motor 50 is provided in the lower portion of the vehicle body, and thus the center of gravity of the vehicle body can be lowered. The lowered center of gravity of the vehicle body enables comfortable travel. Further, the electric motor 50 and the battery 60 are disposed so as to overlap with each other in the front-rear direction, which serves to reduce the width of the electric snowmobile 100 in the front-rear direction.

In the present embodiment, the electric motor 50 is located more rearward than the mounting positions of the right ski 20R and the left ski 20L to the left ski support frame 15L and the right ski support frame 15R. As described, the relatively heavy electric motor 50 is disposed rearward, and thus the center of gravity of the vehicle body can be positioned rearward. This eases the handling of the steering handle 41 and enables comfortable travel. Further, the electric motor 50 is positioned more forward than the front end of the track belt 31. However, the present invention is not limited to this example, and at least a portion of the electric motor 50 may be positioned more forward than the track belt 31.

[Arrangement of Battery 60 and Support Structure of Housing 65 (Battery 60)]

In the present embodiment, the battery 60 has a substantially cubic shape with the length in the front-rear direction larger than the width in the vehicle width direction (left-right direction). That is, the battery 60 is disposed such that the longitudinal direction of the battery 60, is the front-rear direction.

The battery 60 is located more rearward than the lower end of the steering shaft 40. Further, the battery 60 is located forward of the steering handle 41. The battery 60 is located more rearward than the mounting positions of the right ski 20R and the left ski 20L to the left ski support frame 15L and the right ski support frame 15R. As described, the relatively heavy battery 60 is disposed rearward, and thus the center of gravity of the vehicle body can be positioned rearward. This eases the handling of the steering handle 41 and enables comfortable travel. At least a portion of the battery 60 is positioned more forward than the track belt 31.

The battery 60 is contained in a battery housing 65 (hereinafter, simply referred to as housing 65) for protecting the battery 60. The housing 65 has a shape along the outer shape of the battery 60. Specifically, the housing 65 includes a right side wall 651R located along the right side surface of the battery 60, a left side wall 651L located along the left side surface of the battery 60, and a front side wall 652 located along the front side surface of the battery 60.

In the present embodiment, the battery 60 is disposed in a substantially pyramidal region (hereinafter, referred to as a battery housing region BR) surrounded by the right front frame 13R, the left front frame 13L, the right rear frame 14R, and the left rear frame 14L. As shown in FIG. 3, the battery housing region BR is a region formed by a line connecting the left front frame 13L, the left rear frame 14L, and the lower ends of the left front frame 13L and the left rear frame 14L, in a side view. At least a portion of the battery 60 may be disposed in the battery housing region BR. In the example shown in FIG. 3, the upper rear portion of the battery 60 is disposed outside the battery housing region BR, although the entire battery 60 may be disposed within the battery housing region BR.

In the present embodiment, the housing 65 is supported by the right front frame 13R, the left front frame 13L, the right rear frame 14R, and the left rear frame 14L.

The battery 60 is supported by the upper frame via the housing 65. Specifically, the battery 60 is supported by the right front frame 13R, the left front frame 13L, the right rear frame 14R, and the left rear frame 14L via the housing 65. The housing 65 is supported by the upper frame so that the top and bottom surfaces of the battery 60 remain substantially level.

The details of the support structure of the housing 65 will be described.

A mounting portion 131R extending downward is fixed to the right front frame 13R, and a mounting portion 131L extending downward is fixed to the left front frame 13L. A mounting portion 141R extending downward is fixed to the right rear frame 14R, and a mounting portion 141L extending downward is fixed to the left rear frame 14L.

The right front portion of the housing 65 is mounted on the mounting portion 131R fixed to the right front frame 13R. That is, the housing 65 is supported by the right front frame 13R via the mounting portion 131R.

The left front portion of the housing 65 is mounted on the mounting portion 131L fixed to the left front frame 13L. That is, the housing 65 is supported by the left front frame 13L via the mounting portion 131L.

The right rear portion of the housing 65 is mounted on the support portion 141R fixed to the right rear frame 14R. That is, the housing 65 is supported by the right rear frame 14R via the mounting portion 141R.

The left rear portion of the housing 65 is mounted on the support portion 141L fixed to the left rear frame 14L. That is, the housing 65 is supported by the left rear frame 14L via the mounting portion 141L.

The housing 65 may be fixed to each mounting portion of the upper frame using a bolt, for example.

As shown in FIG. 3, the housing 65 is supported by the upper frame of the body frame 10 such that the upper surface of the battery 60 is positioned lower than an upper end E1 of the mounting portion 131L. In other words, the upper end E1 of the mounting portion 131L is positioned above the upper surface of the battery 60. However, the present invention is not limited to this example, and the mounting portion 131L may be positioned at least above the bottom surface of the battery 60. The same applies to the mounting portion 131R.

In this embodiment, the mounting portion 131R is provided in the right front frame 13R at the boundary portion between the forward extending portion 131bR and the inclined portion 131fR, and the mounting portion 131L is provided in the left front frame 13L at the boundary portion between the forward extending portion 131bL and the inclined portion 131fR. Such a configuration allows the battery housing region BR to have a size in accordance with the lengths of the forward extending portion 131bR and the forward extending portion 131bL in the front-rear direction.

In the present embodiment, the battery 60 is disposed upward of the electric motor 50 and the lower frame 18. That is, the battery 60 is suspended in the upper frame of the body frame 10 such that the bottom surface of the battery 60 is apart from the electric motor 50 and the lower frame 18.

The battery 60 is thus supported by the upper frame apart from the lower frame 18, thereby avoiding contact with moisture on the lower frame 18.

As described above, in the present embodiment, the housing 65 is supported at four positions of the upper frame of the body frame 10 via four mounting portions. As such, the load of the battery 60 and the housing 65 is dispersed at four positions of the body frame 10. This prevents the load from being locally applied to the body frame 10. Further, the battery 60 is disposed in the region formed by the upper frame of the body frame 10, and the space is thereby effectively utilized.

In the present embodiment, the example has been described in which the housing 65 is supported via the mounting portion fixed to the upper frame, but is not limited thereto. The housing 65 may be directly mounted on the upper frame and supported.

In the present embodiment, the battery 60 is indirectly supported by the body frame 10 via the housing 65, but is not limited thereto. The battery 60 may be directly supported by the body frame 10.

In the present embodiment, one battery 60 is provided, but the present invention is not limited thereto. For example, a plurality of batteries 60 may be housed in the housing 65, and the housing 65 may be supported by the body frame 10.

Alternatively, one or more batteries may be additionally provided below the driver seat (not shown).

In the present embodiment, the battery 60 is supported by four pipe frames via the housing 65, but is not limited thereto. For example, the battery 60 may be supported at five or more positions of the upper frame. In this case, for example, the housing 65 for housing the battery 60 may be mounted on the right portion 112R and the left portion 112L of the shaft support frame 11 in addition to the right front frame 13R, the left front frame 13L, the right rear frame 14R, and the left rear frame 14L so that the load is dispersed. That is, the battery 60 may be supported at the six positions of the upper frame via the housing 65.

[Modifications]

Figure 5:
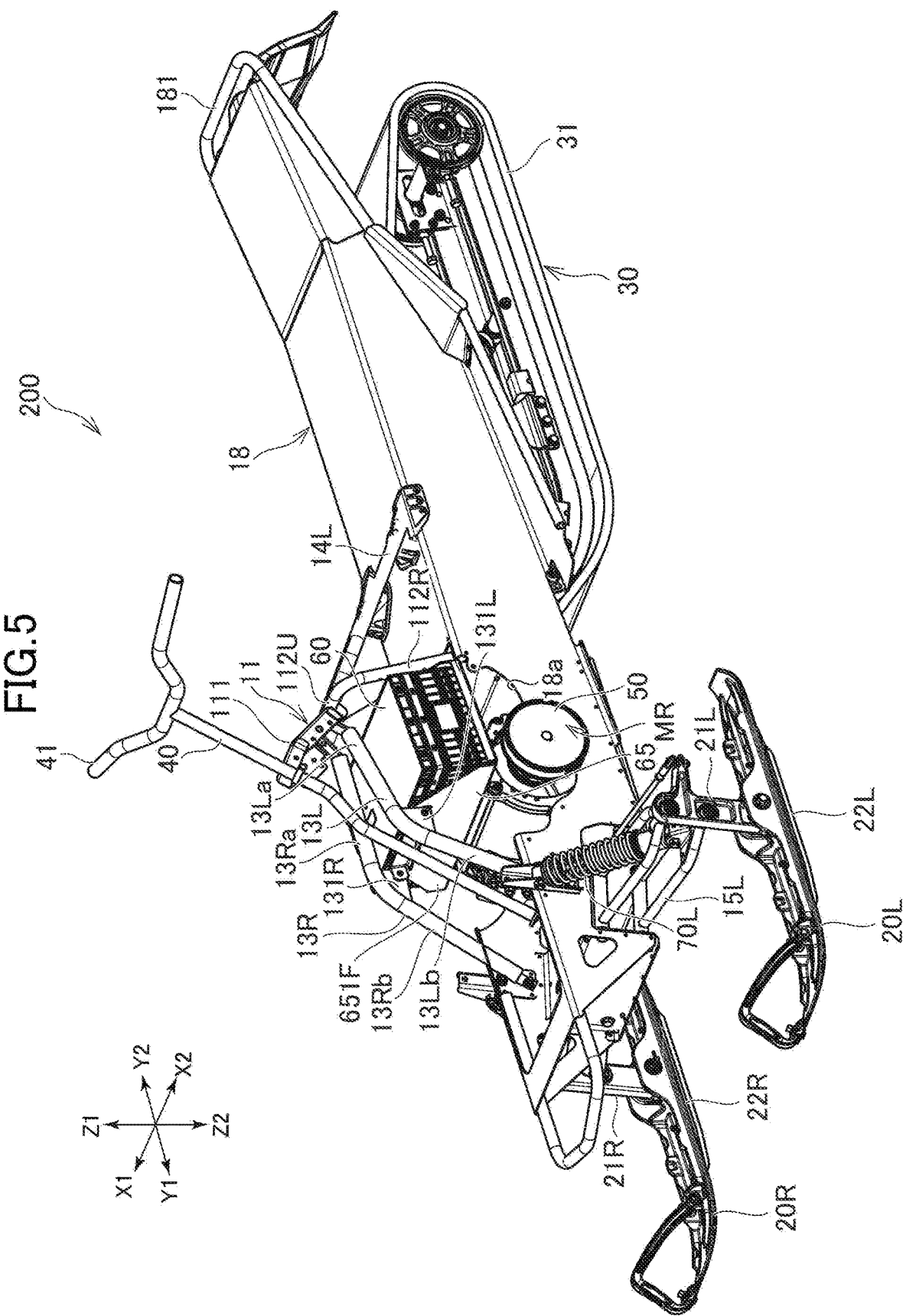
FIG. 5 is a perspective view of an electric snowmobile according to a modification of the present embodiment seen obliquely from above on a front side of the electric snowmobile.
Figure 6:
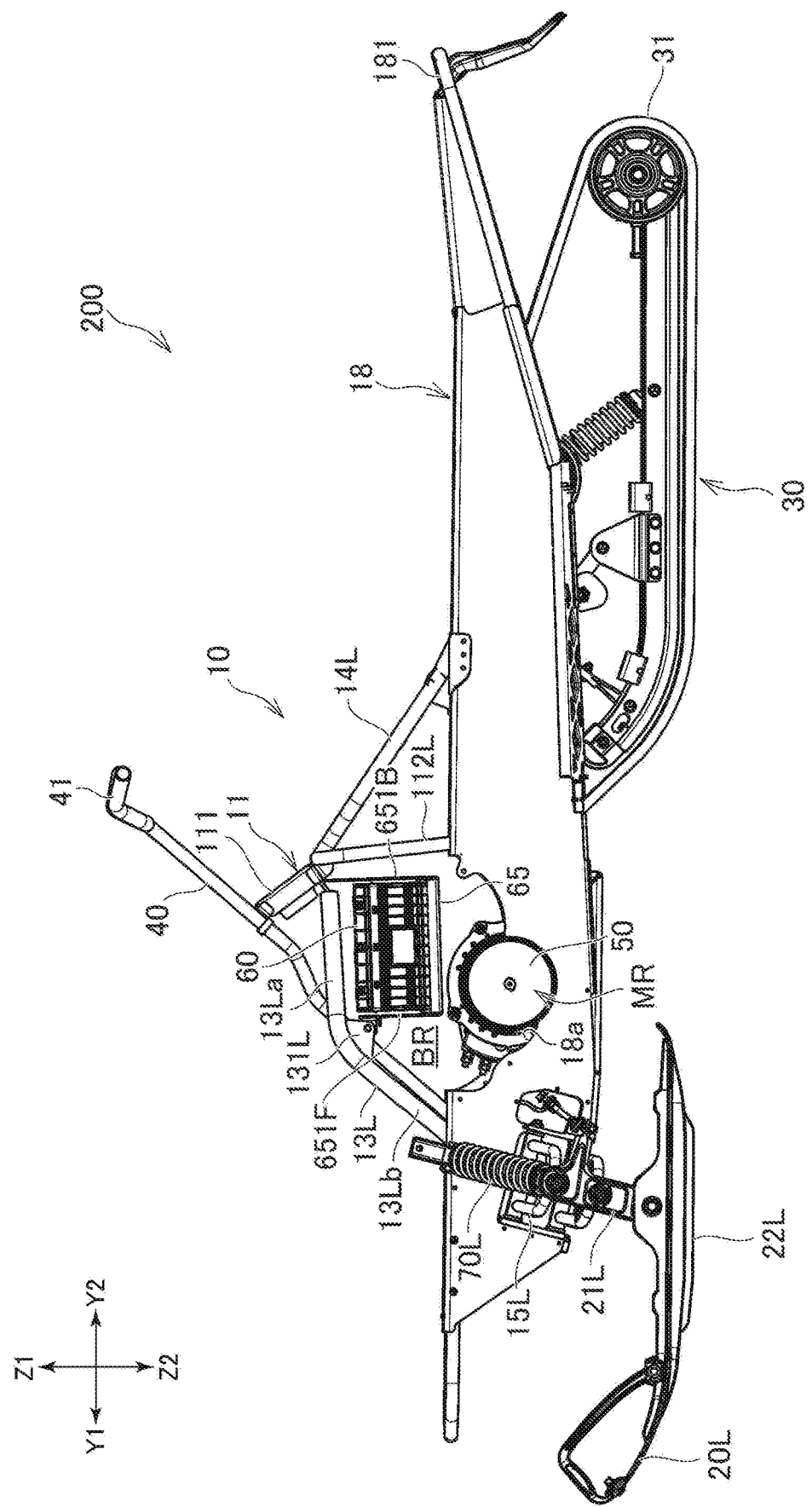
FIG. 6 is a side view of the electric snowmobile according to a modification of the present embodiment seen from the left.
Figure 7:
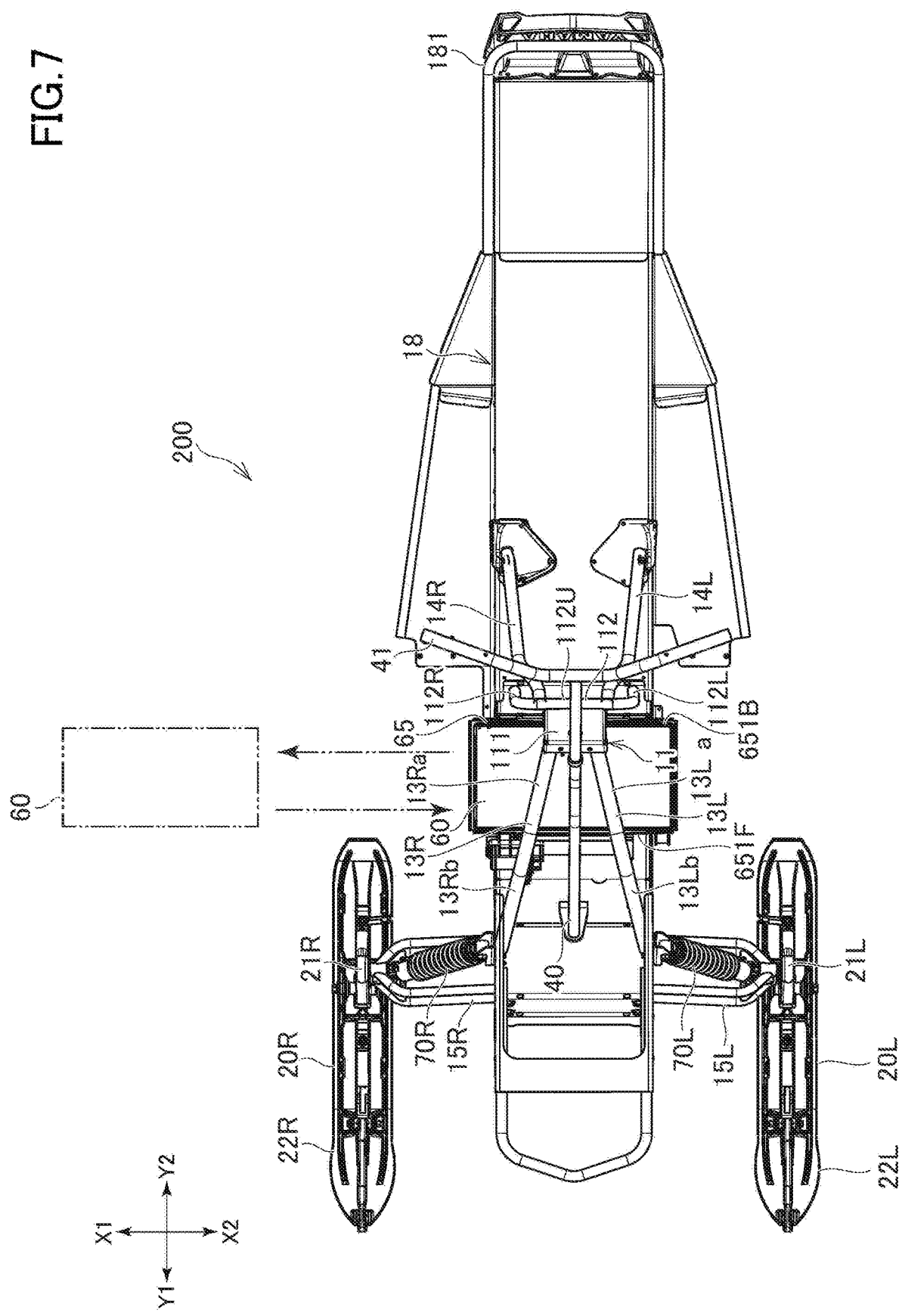
FIG. 7 is a top view of the electric snowmobile according to a modification of the present embodiment.

Next, referring to FIGS. 5 to 7, modifications of the present embodiment will be described. FIG. 5 is a perspective view of an electric snowmobile according to a modification of the present embodiment seen obliquely from above on a front side of the electric snowmobile. FIG. 6 is a side view of the electric snowmobile according to a modification of the present embodiment seen from the left. FIG. 7 is a top view of the electric snowmobile according to a modification of the present embodiment.

An electric snowmobile 200 according to the modification is the same as the electric snowmobile 100 described with reference to FIGS. 1 to 4 except that the support structure of the housing 65 and the orientation of the batteries 60 are different. The same configurations as those of the electric snowmobile 100 are denoted by the same reference numerals, and description thereof is omitted.

In the modification, the battery 60 is disposed such that its longitudinal direction is the vehicle width direction. That is, the battery 60 has a substantially cubic shape with the length in the left-right direction larger than the width in the front-rear direction. As shown in FIG. 7, the battery 60 is disposed such that the left and right ends of the battery 60 are positioned outward of the lower ends of the right front frame 13R, the left front frame 13L, the right rear frame 14R, and the left rear frame 14L in the vehicle width direction.

The battery 60 is housed in the housing 65 for protecting the battery 60. The housing 65 has a shape along the outer shape of the battery 60. Specifically, the housing 65 includes a front sidewall 651F located along the front surface of the battery 60 and a rear sidewall 651B located along the rear surface of the battery 60.

The battery 60 is supported by the body frame 10 via the housing 65 for housing the battery 60.

As shown in FIG. 6, the support portion 111 of the shaft support frame 11 extends rearwardly and downwardly in a side view and rotatably supports the steering shaft 40 at its front end.

The right portion of the front side wall 651F of the housing 65 is mounted on the mounting portion 131R fixed to the right front frame 13R. That is, the housing 65 is supported by the right front frame 13R via the mounting portion 131R.

The left portion of the front wall 651F of the housing 65 is mounted on the mounting portion 131L fixed to the left front frame 13L. That is, the housing 65 is supported by the left front frame 13L via the mounting portion 131L.

The rear sidewall 651B of the housing 65 is mounted on the support portion 111 of the shaft support frame 11. That is, the housing 65 is supported by the support portion 111 of the shaft support frame 11.

As described above, in the modification, the housing 65 is supported by the body frame 10 at three positions: the mounting portion 131R fixed to the right front frame 13R, the mounting portion 131L fixed to the left front frame 13L, and the support portion 111 of the shaft support frame 11.

In the modification, the battery 60 is disposed such that the longitudinal direction is the vehicle width direction, and thus more space can be obtained in the front-rear direction as compared with the configuration in which the battery 60 is disposed such that the longitudinal direction is the front-rear direction. As such, for example, another battery can be also disposed so as to be adjacent to the battery 60 in the front-rear direction.

Further, the housing 65 is supported at three positions of the body frame 10, and this configuration enables simplification of the support structure as compared with the configuration in which the housing 65 is supported at four positions as shown in FIG. 1.

[Attachment and Detachment of Battery 60]

Referring to FIGS. 3 and 7, attachment and detachment of the battery 60 will be described. In FIGS. 3 and 7, the battery 60 before being housed in the housing 65 or after being detached from the housing 65 is shown in a two-dot chain line. Further, the arrows in FIGS. 3 and 7 show the moving direction of the battery 60 when being detached.

As described above, in the present embodiment, the battery 60 is disposed such that its longitudinal direction is the front-rear direction (see e.g., FIG. 3). The housing 65 includes a right side wall 651R standing along the right side surface of the battery 60, a left side wall 651L standing along the left side surface of the battery 60, and a front side wall 652 standing along the front side surface of the battery 60, and the rear portion of the housing 65 is open. In such a configuration, as shown in FIG. 3, when attaching the battery 60 to the electric snowmobile 100, the battery 60 may be inserted into the housing 65 from the rear to be housed in the housing 65. When detaching the battery 60 from the electric snowmobile 100, on the other hand, the battery 60 may be moved rearward to be detached from the housing 65. As described above, the housing 65 is configured to have the side walls along the moving direction of the battery 60 when attaching and detaching the battery 60, and the side walls of the housing 65 (the right side wall 651R and the left side wall 651L) thereby serve as guides when moving the battery 60. This allows the battery 60 to be easily attached and detached.

Further, as described above, in the modification of the present embodiment, the battery 60 is disposed such that its longitudinal direction is the vehicle width direction (see e.g., FIG. 7). The housing 65 includes a front side wall 651F located along the front side surface of the battery 60 and a rear side wall 651B located along the rear side surface of the battery 60, and the right and left portions of the housing 65 are open. In such a configuration, as shown in FIG. 7, when attaching the battery 60 to the electric snowmobile 200, the battery 60 may be inserted into the housing 65 from the right so as to be housed in the housing 65. When detaching the battery 60 from the electric snowmobile 200, on the other hand, the battery 60 may be moved rightward so as to be detached from the housing 65. However, the present invention is not limited thereto, and the battery 60 may be inserted from the left when being housed or may be moved to the left when being detached. As described above, the housing 65 is configured to have the side walls along the moving direction of the battery 60 when attaching and detaching the battery 60, and the side walls of the housing 65 (the front side wall 651F and the rear side wall 651B) thereby serve as guides when moving the battery 60. This allows the battery 60 to be easily attached and detached.

Outline of Embodiment (1) An electric snowmobile 100 includes a body frame 10, a right ski 20R and a left ski 20L supported by the body frame, a track mechanism 30 including a track belt 31 and supported by the body frame 10 more rearward than the right ski 20R and the left ski 20L, a steering shaft 40 supported by the body frame 10, an electric motor 50 supported by the body frame 10, a battery 60 supported by the body frame 10 and supplying electric power to the electric motor 50, wherein the body frame 10 includes a shaft support frame 11 that rotatably supports the steering shaft 40, a front frame 13L that extends forwardly and downwardly from the shaft support frame 11, and a rear frame 14L that extends rearwardly and downwardly from the shaft support frame 11, and the battery 60 is supported by the front frame 13L and the rear frame 14L such that at least a portion of the battery 60 is disposed in a region BR formed by a line connecting the front frame 13L, the rear frame 14L, a lower end of the front frame 13L, and a lower end of the rear frame 14L in a side view.

(2) The front frame includes a right front frame 13R and a left front frame 13L that are provided to be spaced apart from each other in a vehicle width direction, the rear frame includes a right rear frame 14R and a left rear frame 14L that are provided to be spaced apart from each other in a vehicle width direction, and the battery 60 is supported by the right front frame 13R, the left front frame 13L, the right rear frame 14R, and the left rear frame 14L.

(3) The electric snowmobile includes a housing 65 for housing the battery, and the battery 60 is supported by the front frame and the rear frame via the housing.

(4) The housing 65 is mounted on the front frame 13L and the rear frame 14L at a mounting portion 131L positioned above a bottom surface of the battery 60.

(5) The housing 65 is mounted on at least one of the front frame 13L or the rear frame 14R at a mounting portion 131L, where at least a portion of the mounting portion is positioned above an upper surface of the battery 60.

(6) The battery 60 is positioned more rearward than the lower end of the steering shaft 40.

(7) The battery 60 is positioned more rearward than the mounting positions of the right ski 20R and left ski 20L to the body frame 10.

(8) At least a portion of the battery 60 is positioned more forward than the track belt 31.

(9) The electric motor 50 is supported on the body frame 10 below the battery 60.

(10) The battery 60 is supported by the front frame and the rear frame such that a bottom surface of the battery 60 is apart from the body frame 10.

(11) The electric motor 50 is positioned more rearward than the mounting positions of the right ski 20R and left ski 20L to the body frame 10.

(12) The electric motor 50 is positioned more forward than the track belt 31.

(13) The battery 60 has a substantially cubic shape in which a width of the battery 60 in a front-rear direction is larger than a width of the battery 60 in a vehicle width direction.

(14) The battery 60 has a substantially cubic shape in which a width of the battery 60 in a vehicle width direction is larger than a width of the battery 60 in a front-rear direction.

The present invention is not limited to embodiment described above, and various modifications can be made. For example, the configurations described in embodiment can be replaced by a configuration that is substantially the same, a configuration that provides the same action and effect, or a configuration that is capable of achieving the same object.

What is claimed is:

1. An electric snowmobile comprising:
a body frame;
a ski supported by the body frame;
a track mechanism, which includes a track belt, and the track mechanism being supported by the body frame more rearward than the ski;
a steering shaft supported by the body frame;
an electric motor supported by the body frame;
a battery supported by the body frame, the battery supplying electric power to the electric motor; wherein
the body frame includes a shaft support frame that rotatably supports the steering shaft, a front frame that extends forwardly and downwardly from the shaft support frame, and a rear frame that extends rearwardly and downwardly from the shaft support frame, wherein the battery is supported by the front frame and the rear frame such that at least a portion of the battery is disposed in a region formed by a polygon connected by the front frame, the rear frame, a lower end of the front frame, and a lower distal end of the rear frame, in a side view, wherein the body frame includes a lower frame extending in a front-rear direction, wherein the lower distal end of the rear frame is attached to the lower frame;

wherein the snowmobile further comprises a housing fixed to both the front frame and the rear frame; and wherein the battery is configured to be detachable from the housing.

2. The electric snowmobile according to claim 1, wherein the front frame includes a right front frame and a left front frame that are spaced apart from each other in a vehicle width direction, the rear frame includes a right rear frame and a left rear frame that are spaced apart from each other in a vehicle width direction, and the battery is supported by the right front frame, the left front frame, the right rear frame, and the left rear frame.

3. The electric snowmobile according to claim 1, wherein the battery is supported by the front frame and the rear frame via the housing.

4. The electric snowmobile according to claim 3, wherein the housing is mounted on the front frame and the rear frame at a mounting portion positioned above a bottom surface of the battery.

5. The electric snowmobile according to claim 3, wherein the housing is mounted on at least one of the front frame or the rear frame at a mounting portion, at least a part of the mounting portion being positioned above an upper surface of the battery.

6. The electric snowmobile according to claim 1, wherein the battery is positioned more rearward than a lower end of the steering shaft.

7. The electric snowmobile according to claim 1, wherein the battery is positioned more rearward than a mounting position of the ski on the body frame.

8. The electric snowmobile according to claim 1, wherein at least a portion of the battery is positioned more forward than the track belt.

9. The electric snowmobile according to claim 1, wherein the electric motor is supported by the body frame further downward than the battery.

10. The electric snowmobile according to claim 1, wherein
the battery is supported by the front frame and the rear frame such that a bottom surface of the battery is apart from the body frame.

11. The electric snowmobile according to claim 1, wherein
the electric motor is positioned more rearward than a mounting position of the ski to the body frame.

12. The electric snowmobile according to claim 1, wherein
the electric motor is positioned more forward than the track belt.

13. The electric snowmobile according to claim 1, wherein
the battery has a substantially cubic shape in which a length of the battery in a front-rear direction is larger than a width of the battery in a vehicle width direction.

14. The electric snowmobile according to claim 1, wherein
the battery has a substantially cubic shape in which a length of the battery in a vehicle width direction is larger than a width of the battery in a front-rear direction.

15. The electric snowmobile according to claim 1, wherein the lower distal end of the rear frame is directly attached to the lower frame.

* * * * *